United States Patent
Chakraborty et al.

(10) Patent No.: US 12,052,583 B2
(45) Date of Patent: Jul. 30, 2024

(54) RADIO MAPPING ARCHITECTURE FOR APPLYING MACHINE LEARNING TECHNIQUES TO WIRELESS RADIO ACCESS NETWORKS

(71) Applicant: Saankhya Labs Pvt. Ltd., Bangalore (IN)

(72) Inventors: Arindam Chakraborty, Ghaziabad (IN); Parag Naik, Bangalore (IN); Anindya Saha, Bangalore (IN); Vishwakumara Kayargadde, Bangalore (IN); Susmit Kumar Datta, Bangalore (IN)

(73) Assignee: SAANKHYA LABS PVT. LTD., Bangalore (IN)

( * ) Notice: Subject to any disclaimer, the term of this patent is extended or adjusted under 35 U.S.C. 154(b) by 227 days.

(21) Appl. No.: 17/281,218

(22) PCT Filed: May 20, 2020

(86) PCT No.: PCT/IN2020/050456
§ 371 (c)(1),
(2) Date: Mar. 29, 2021

(87) PCT Pub. No.: WO2020/234902
PCT Pub. Date: Nov. 26, 2020

(65) Prior Publication Data
US 2023/0062443 A1    Mar. 2, 2023

(30) Foreign Application Priority Data
May 20, 2019 (IN) .............................. 201941019899

(51) Int. Cl.
*H04W 16/22* (2009.01)
*H04W 24/08* (2009.01)

(52) U.S. Cl.
CPC ........... *H04W 16/22* (2013.01); *H04W 24/08* (2013.01)

(58) Field of Classification Search
CPC ..... H04W 16/22; H04W 24/08; H04W 24/04; G06N 20/00
See application file for complete search history.

(56) References Cited

U.S. PATENT DOCUMENTS

| | | | |
|---|---|---|---|
| 5,901,142 A * | 5/1999 | Averbuch | H04L 69/164 455/458 |
| 10,791,221 B1 * | 9/2020 | Vislocky | H04M 3/5116 |
| 2010/0178929 A1 * | 7/2010 | Kennedy, Jr. | G01S 5/021 455/456.1 |

(Continued)

*Primary Examiner* — John D Blanton

(57) ABSTRACT

A radio mapping architecture for applying machine learning techniques to mobile wireless radio access networks, including a base station, a user equipment (UE), and a network is provided. The radio mapping architecture includes a spectrum monitoring unit and a server and utilizes the UE. The server includes a radio mapping database and a Machine Learning module. The UE or the spectrum monitoring unit captures Radio parameters to derive an input schema for the radio mapping database. The spectrum monitoring unit extracts the Radio parameters that correspond to the base station and the UE and updates them in the radio mapping database periodically. The input schema for the radio mapping database is updated with the Radio parameters sensed by the spectrum monitoring unit and the UE.

22 Claims, 11 Drawing Sheets

(56) References Cited

U.S. PATENT DOCUMENTS

| | | | |
|---|---|---|---|
| 2012/0021692 A1* | 1/2012 | Lee | H04B 7/0617 |
| | | | 455/67.11 |
| 2018/0191416 A1* | 7/2018 | Palenius | G01S 11/10 |
| 2021/0377825 A1* | 12/2021 | Deenoo | H04W 36/0077 |
| 2022/0201423 A1* | 6/2022 | Freda | H04L 5/0094 |
| 2022/0201779 A1* | 6/2022 | Nakamura | H04W 40/12 |

\* cited by examiner

RADIO MAPPING ARCHITECTURE FOR APPLYING MACHINE LEARNING TECHNIQUES TO WIRELESS RADIO ACCESS NETWORKS

CROSS-REFERENCE TO RELATED APPLICATIONS

This application claims priority to Indian provisional patent application no. 201941019899 filed on May 20, 2019, the complete disclosure of which, in its entirety, is herein incorporated by reference.

BACKGROUND

Technical Field

The embodiments herein generally relate to a radio mapping architecture, and more particularly, to a radio mapping architecture for applying Machine Learning (ML) techniques to wireless radio access networks.

Description of the Related Art

Currently, Network planning techniques for deployment of wireless networks tend to be static which leads consequently to optimization for worst-case cell or area coverage with undue emphasis on edge users. A cell edge refers to a region within a service area of a cell nearest to a boundary of service areas of neighboring cells. Mobile stations within the cell edge are assumed to have relatively higher path loss for signals from their serving cells and relatively lower path loss for potentially interfering signals from other nearby cells. Radio environments vary significantly over (short) time intervals and space tending to be dynamic and hence such static network planning techniques of the mobile wireless networks results in reduced spectral efficiency and in general results in a sub-optimal usage of spectral resources More specifically, a portion of bandwidth allocated to reference signals and robustness of these reference signals are statically configured such that it allows demodulation even under the worst-case scenario. As such, these lead to higher unnecessary overheads when Radio Frequency (RF) conditions are more benign.

As mentioned earlier the radio environments tend to be dynamic and change rapidly based on a diverse set of parameters. Typically, a configuration of such a network is done by configuring a wide range of parameters. Some of the parameters are static, assuming the worst-case scenario, while a few are measured dynamically on-the-fly, after which inferences are drawn. In general, the configuration of such a system is either quasi-static in nature or based on a single set of measurements having a significant random error. Also, with advances in computing power and machine learning architectures, it is now possible to perform analysis using historical and contextual data to have a more accurate estimation of the RF conditions at the given location. Moreover, the network doesn't track the dynamic nature of the radio environments. However, a Software-Defined-Network (SDN) or a network functions virtualization NFV has solved the problem to an extent in a higher layer of the typical network where Machine Learning (ML) techniques are implemented efficiently. The following is a list of reasons for the lack of Machine Learning (ML) techniques in the access layer and a physical layer (Layer 1) of the edge networks.

1. Lack of large data sets available for mapping radio frequency RF parameters such as a channel state information CSI/CQI, a signal to noise ratio SNR and the like,
2. Unstructured data (for example, accurate geo-tagging) for further use,
3. Modems measure a wide range of parameters (in Physical and MAC Layers) which are generally not available in a form that may be used for further network optimization.

Massive multiple-input and multiple-output (MIMO) systems in the recent past have promised exceptionally high spectral efficiency in the traditional mobile network. The MIMO systems is a method for multiplying capacity of a radio link using multiple transmission and receiving antennas to exploit multipath propagation. The MIMO systems have done this using virtue of having a huge number of antenna and transceiver chains. The MIMO systems rely on beamforming to create multiple virtual channels thereby increasing the capacity of mobile networks drastically.

Most Massive MIMO systems show extremely high spectral efficiency in conditions where the channel state information (CSI) is perfectly known. The beamforming technique is employed by the MIMO systems relies on reliable channel state information (CSI). However, in practice, the MIMO systems rarely give a marginal improvement in the order of 2-3× compared to the 16× or higher as stated. This is largely due to the fact the CSI in field conditions is hardly ideal and many cases not accurately available when the user equipment is a mobile and especially indoors. The CSI is used by the channel estimation to beam-form to a particular user device and the lack of reliable CSI results in an incorrect estimation.

Moreover, in current mobile wireless networks indicators such as CQI a best-serving base station, handoff between base stations, modulation, and coding for bearers and channel estimation are all based on single point measurements done on a user equipment UE. Typically in currently deployed networks, real-time measurements are done to determine the channel parameters for optimal reception. Due to wide fluctuations in the measurement data due to both the RF environment and the imperfections in the receiver implementations, such an implementation does not capture the time and space variations of the radio the environment. This results in the poor estimation of critical radio frequency RF parameters (for example a signal-to-interference-plus-noise ratio SINR, a received signal strength indicator RSSI and the like). Large variations of SNR result in sub-optimal decisions affecting the mobile wireless network performance, e.g., high Bit Error Rate (BER), more Automatic Repeat Request (ARQ) or Hybrid Automatic Repeat Request (HARM), underutilized capacity of the mobile wireless network and the like, and failure of implementing interference mitigation strategies (For example enhanced inter-cell interference coordination eICIC) due to poor estimation of interferers.

Accordingly, there is a need for mitigating and/or overcoming drawbacks associated with current systems and methods.

SUMMARY

In view of the foregoing, embodiments herein provide a radio mapping architecture for a wireless network. The radio mapping architecture includes a User Equipment (UE), a spectrum monitoring unit and a server. The server includes a radio mapping database and a Machine Learning (ML) module. The UE performs measurements of one or more Radio parameters. The spectrum monitoring unit (ii) captures the one or more Radio parameters, (ii) continuously monitors the one or more Radio parameters and stores the one or more Radio parameters in the radio mapping database, (iii) extracts the one or more Radio parameters that correspond to one or more base stations and the User Equipment (UE) to populate an input schema for the radio mapping database and periodically updates extracted parameters in the radio mapping database. The input schema is a database schema of the radio mapping database and describes a structure of the radio mapping database.

The server includes the radio mapping database that periodically captures the one or more Radio parameters from the UE and the spectrum monitoring unit. The radio mapping database periodically captures extracted parameters and geo-tagged results from the spectrum monitoring unit. The input schema for the radio mapping database is updated with the one or more Radio parameters sensed by at least one of (i) the spectrum monitoring unit and (ii) the UE. The Machine Learning (ML) module is used to (i) train a Machine Learning model based on the one or more Radio parameters stored in the radio mapping database, (ii) predict one or more dynamically changed parameters from the input schema that is stored in the radio mapping database to derive an output schema based on the ML model, (iii) update the one or more dynamically changed parameters that are predicted by the ML model in the radio mapping database, (iv) dynamically refine the ML Model based on the one or more Radio parameters or the extracted parameters and (v) generate triggers to the spectrum monitoring unit and the UE to update the one or more Radio parameters stored in the radio mapping database.

In some embodiments, the input schema derived by the spectrum monitoring unit from the one or more Radio parameters include one or more location parameters, one or more RF parameters, one or more network parameters and one or more physical layer parameters.

In some embodiments, the one or more location parameter includes time of measurement, latitude, longitude, altitude and Dilution of Precision (DoP). In some embodiments, the one or more RF parameters includes Channel Impulse Response (CIR), Receive Strength Indicator (RSSI), Reference Signal Receive Power RSRP, Reference Signal Received Quality RSRQ, Signal-to-Interference-plus-Noise Ratio (SINK), an adjacent channel interferer level, a channel model, transmitter power and carrier frequency. In some embodiments, the one or more RF parameters Geo-tagged and time stamped. In some embodiments, the one or more network parameters includes model of the UE, base stations (BTS) which are visible to the UE, Public Land Mobile Network (PLMN) identity, Type Allocation Code (TAC), Carrier Aggregation (CA) configuration and Physical Cell ID (PCI). In some embodiments, the one or more physical layer parameters include Hybrid automatic repeat request (HARQ), Rank, Block Error Rate (BLER), jitter and call muting.

In some embodiments, the base station (BTS) denotes a number of base stations that include Physical Cell Identity (PCI) and a delay associated with propagation time from a base station to the spectrum monitoring unit. In some embodiments, the base stations include multi-user multiple input multiple output (MU-MIMO) capability.

In some embodiments, the output schema derived from the one or more dynamically changed parameters includes latitude, longitude, altitude, and predicted Radio parameters. In some embodiments, the prediction Radio parameters include the RSRP, the RSRQ, the SINR, a channel model and a channel matrix.

In some embodiments, the ML module designs a group of signal waveforms to provide optimum performance to the UE at a location based on the dynamically predicted Radio parameters and the one or more Radio parameters correspond to the location of the UE stored at the radio mapping database.

In some embodiments, the Machine Learning Module periodically sends the triggers to the UE to send a current channel state information (CSI) corresponds to the location and updates the radio mapping database with the current channel state information received from the UE.

In some embodiments, the Machine Learning Module estimates doppler shifts when the base station identifies that the UE is moving.

In some embodiments, the Machine Learning Module determines the movement of the UE using at least one of (i) changes in Global Navigation Satellite System (GNSS) coordinates, (ii) the predicted Radio parameters or (iii) inertial sensors associated with the UE if the GPS coordinates are available at the UE.

In some embodiments, if GPS coordinates are not available at the UE, the Machine Learning module determines the location of the UE based on a combination of Observed Time Difference of Arrival (OTDOA) algorithms and a Bluetooth low energy (BLE) or Wi-Fi based beacons that are available.

In some embodiments, if the base station needs to beamform to the UE, the base station (i) requests the UE to send location information of the UE, (ii) queries the radio mapping database for the current state information (CSI) based on the location information shared by the UE and (iii) uses the CSI retrieved from the radio mapping database to beamform.

In some embodiments, the radio mapping database includes extrapolated CSI to a fine resolution on each point in a coverage area. In some embodiments, the CSI is extrapolated by (i) sampling the coverage area around one or more sampling points, (ii) selecting a sampling point based on a nature of the one or more RF parameters that are stored in the radio mapping database, and (iii) interpolating the CSI if a selected sampling point is within the one or more sampling points or extrapolating the CSI if the selected sampling point is not in the one or more sampling points.

In some embodiments, the Machine Learning module samples the coverage area by sub-dividing the coverage area into grids. In some embodiments, size of a grid is configurable and decided based on at least one of (i) frequency of interest, and (ii) a terrain that affects radio propagation.

In some embodiments, a cellular core network that queries the radio mapping database for a predicted base station to serve the UE.

In some embodiments, the Machine Learning module predicts the base station to serve the UE and stores the predicted base station at the radio mapping database. In some embodiments, the Machine Learning module predicts the base station to serve the UE using at least one of (i) a Radio Access Technology, (ii) an optimal beam shape that is synthesized by the base station or (iii) an access point to serve the location.

In some embodiments, if the UE moves from the location, the Machine Learning module assigns the UE to a new base station that is predicted by the machine learning module to serve the UE. In some embodiments, the Machine Learning module communicates access information that corresponds to the access point predicted by the Machine Learning module, to the UE over an Ultra-High Frequency (UHF) broadcast link.

In some embodiments, the spectrum monitoring unit includes one or more RF Down converters, one or more software-defined demodulators, an agile RF down-converter and a frequency sweep source. The one or more RF Down converters include a common frequency and timing reference. The one or more software-defined demodulators captures a significant part of a radio frame, in a form of I and Q samples. The agile RF down-converter used in stand-alone mode to (i) capture RF signals at different carrier frequencies and (ii) determine channel leakages. In some embodiments, the agile RF down-converter analyses different RF communication standards in parallel. The frequency sweep source associated with the agile RF down-converter enables an Enhanced Software Defined Demodulator to scan a wide range of frequencies in a given location.

In some embodiments, the spectrum monitoring unit includes a GNSS module, a cellular modem, a monitoring circuit and an event logger. The GNSS module determines latitude, longitude and altitude of the location. In some embodiments, the GNSS module provides the Dilution of Precision (DoP) indicates an estimated error in GPS values. The cellular modem is capable of making voice calls and data calls to a network and measuring the Received signal strength indicator (RSSI), the Reference Signal Receive Power (RSRP), the Signal-to-interference-plus-noise ratio (SINR), the Reference Signal Received Quality (RSRQ), the Block Error Rate (BLER), the Packet Jitter and the call muting. The monitoring circuit snoops an uplink control signaling to detect events that include schedule requests, incidences of Acknowledgment (ACK), Negative Acknowledgment (NACK) and Hybrid automatic repeat request (HARD). The event logger captures the detected events from the monitoring circuit and generates the triggers to update the one or more Radio parameters stored in the radio mapping database based on an occurrence of specific combinations of the events. In some embodiments, the specific combinations of the events are related to network disruption, detection of jamming, interference detection or higher than expected traffic.

In one aspect a method of populating a radio mapping database of a radio mapping architecture and updating predicted Radio parameters in the radio mapping database with updated Radio parameters is provided. The method includes (i) enabling at least one of a user equipment (UE) and a spectrum monitoring unit to extract one or more Radio parameters, (ii) capturing the one or more Radio parameters from at least one of the spectrum monitoring unit and the UE based on a capability of the spectrum monitoring unit and the UE, (iii) periodically storing the one or more Radio parameters in the radio mapping database, (iv) exchanging the one or more Radio parameters between the radio mapping database with a cellular core network, (v) generating a Radio parameter prediction model based on a Machine learning model generated by a Machine learning Module, (vi) accepting the updated Radio parameters if there is a change in at least one of a location of the UE or RF environment that is sensed by the UE, (vii) refining the Radio parameter prediction model based on the updated Radio parameters and (viii) updating the predicted Radio parameters in the radio mapping database for a given location of the UE using a refined Radio parameter prediction model.

In some embodiments, the cellular core network, a radio access network and a scheduler, access the radio mapping database through predefined Application Programming Interfaces (APIs).

In some embodiments, the cellular core network along with the base station includes a large repository of information that includes an association of the cellular core network along with the base station with the channel estimation and angle of arrival of the uplink signals from the UE. In some embodiments, the radio mapping database captures the information from the cellular core network along with the base station.

In some embodiments, the Radio parameter prediction model (i) imports 3D terrain map, (ii) segments the 3D terrain map to determine a segment that includes one or more areas with similar RF environment, (iii) statistically samples the segment, (iv) runs preliminary predicted Radio parameters on a sampled segment, (v) gathers field measurement data for the segment, (vi) tunes the Radio parameter prediction Model with the updated Radio parameters to obtain an upgraded Radio parameter prediction model based on the segment and (vii) uses the upgraded Radio parameter prediction model to perform the Radio parameter prediction on the segments that include similar morphology. In some embodiments, the preliminary predicted Radio parameters are selected based on a best-suited Radio parameter prediction model corresponding to the segment.

In some embodiments, the Radio parameter prediction model stores layers of data that are over-laid over 3D terrain data for a given location in the radio mapping database. In some embodiments, the layers of data include a first layer, a second layer, a third layer and a fourth layer. In some embodiments, the first layer represents the 3D terrain data, the second layer represents a first level of the Radio parameter prediction, the third layer represents a measurement of sample points and the fourth layer represents the predicted Radio parameters based on the upgraded Radio parameter prediction model.

In another aspect, a method of predicting one or more dynamically changed parameters using a radio mapping architecture is provided. The method includes (i) capturing, using at least one of a spectrum monitoring unit or a User Equipment (UE), one or more Radio parameters, (ii) continuously monitoring, using the spectrum monitoring unit, the one or more Radio parameters and storing the one or more Radio parameters in a radio mapping database, (iii) extracting, using the spectrum monitoring unit, the one or more Radio parameters that correspond to one or more base stations and the User Equipment (UE) to populate an input schema for the radio mapping database and periodically updating extracted parameters in the radio mapping database, (iv) training, using a Machine learning module associated with a server, a Machine Learning model based on the one or more Radio parameters stored in the radio mapping database, (v) predicting the one or more dynamically changed parameters from the input schema that is stored in the radio mapping database to derive an output schema based on the ML model, (vi) updating the one or more dynamically changed parameters that are predicted by the ML model in the radio mapping database, (vii) dynamically refining the ML Model based on the one or more Radio parameters or the extracted parameters and (viii) generating triggers to the spectrum monitoring unit and the UE to update the one or more Radio parameters stored in the radio mapping database.

In some embodiments, the radio mapping architecture allows machine learning techniques to be incorporated in modem implementation. For massive MIMO systems, the radio mapping architecture improves spectral efficiency drastically and makes it practical. The radio mapping architecture enables channel estimation algorithms on receivers with additional data and makes a receiver optimal. In some embodiments, digitized architectures may bring in innovations to receiver algorithms and revolutionizes mobile wireless network deployments. The mobile wireless networks may become more adaptive thereby improving the overall efficiency of networks.

In some embodiments, the radio mapping architecture involves an implementation of base stations which support MIMO including MU-MIMO and beamforming, depending on the user location, a pre-distorted (in both temporal and spatial domains) signal can be transmitted based on the predicted channel impulse response and channel matrix, which results in optimal reception at the User Equipment.

In some embodiments, the radio mapping architecture includes the radio mapping database provides improved results on a process of digitizing a modem interface to query and generate useful information for analytics which allows all computationally complex tasks in the background process is in non-real time. In some embodiments, the radio mapping architecture uses multiple measurements are used in the same location for selecting transmission parameter (such as RAT, power level, modulation, and coding) for more accurate results. In some embodiments, computation in the radio mapping architecture is in non-real-time which significantly reduces the complexity of the base station and the access points. In some embodiments, the radio mapping architecture may enable traffic offload strategies, such as Broadcast Offload to UHF, Wi-Fi offload, offload to mm-wave (60 GHz), and the like if a cloud-based core network includes information on traffic loads in the different RATs in a given area.

In some embodiments, the radio mapping architecture accurately determines the location of the user equipment (UE) in a GPS denied environment. In some embodiments, the radio mapping architecture includes the best possible channel parameters that are Subsequently informed to both the UE and the base station to start a communication process. This assumes significance in the case of MIMO communication by offloading a significant portion of the computational effort from both the UE, and the base station, saving complexity, power consumption and improving the channel estimation time. Infrastructure such as this embodiment can assume greater significance once such methodologies and infrastructure become commonplace and are incorporated in the next generation communication standards.

In some embodiments, the radio mapping architecture makes a significant improvement in spectral efficiency is in broadcast networks. Current broadcast standards such as ATSC 3.0 and DVB-T2 has a wide range of configurable physical layer parameters such as Guard Interval, FFT size, Modulation and Coding, etc. Using the radio mapping architecture described in the current embodiment, the best parameters may be dynamically selected based on current RF conditions and an active number of users for a given content and their spatial distribution. In some embodiments, the radio mapping architecture enables multimedia traffic involving audio and video content, transcoding to a particular codec profile can be done which is most suitable for the worst-case channel condition and the modulation and coding used. For a unicast network, such a scheme is used by protocols like DASH. The radio mapping architecture extends the same to a broadcast network.

In some embodiments, the radio mapping architecture may provide a broadcast network based on Low Power Low Tower (LPLT) transmitters using Single Frequency Network (SFN) is by providing a means to provide localized broadcast services. Treating the RF map as an image, if image segmentation techniques are used to find smaller clusters out of an overall cellularized broadcast network to create a localized SFN for a given target bit-rate corresponding to the worst-case SINR at the cluster boundary.

In some embodiments, the radio mapping architecture may optimize a code rate of such an error-correcting mechanism in Broadcast networks so that bandwidth may be saved by not using an extremely low code rate that requires more bandwidth for carrying the same information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
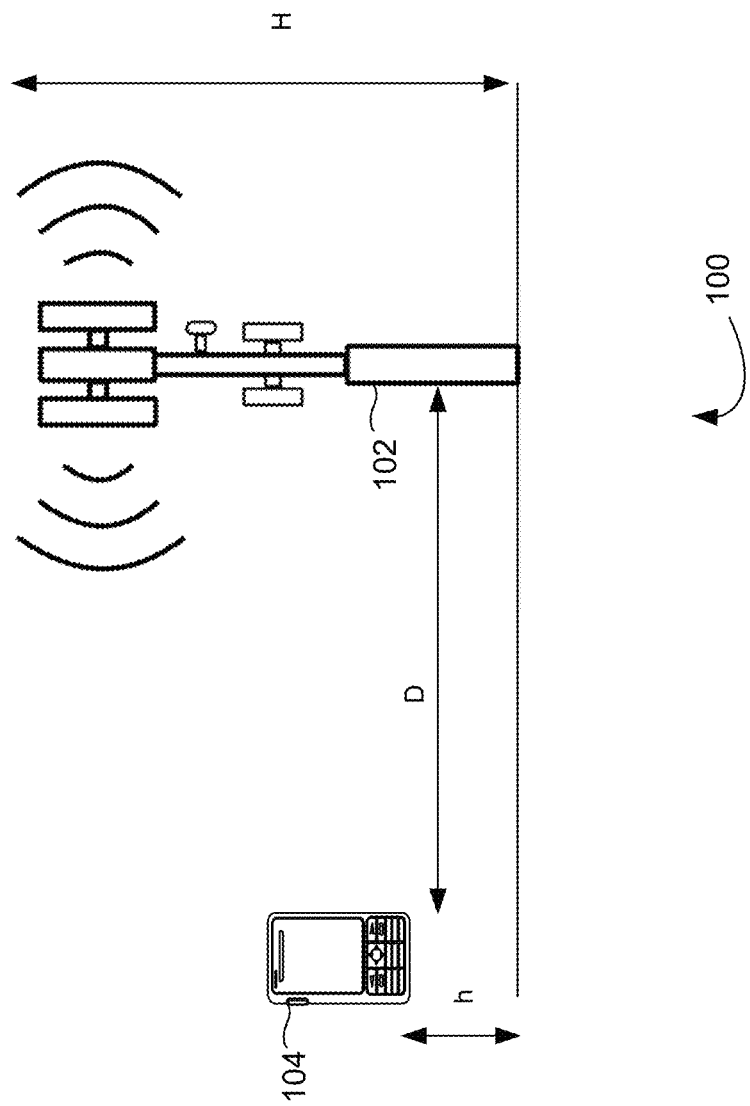
FIG. 1 is a block diagram that illustrates one or more Radio parameters that affect signal quality from a base station to a User Equipment (UE) and from the UE to the base station according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a radio mapping architecture to improve performance of mobile wireless networks. The embodiments herein achieve this by proposing digitization of the radio frequency RF environment, which involves the creation of a geographical database that captures the RF environment in a particular location.

Definitions

Radio map: Radio Map is defined as a database that associates a set of measured or derived wireless parameters with specific geographical location.

Digitization: Digitization refers to an accessible database of RF parameters and predicted data that has been time stamped and geo-tagged. In some embodiments, most modems that generate these highly useful data have proprietary interfaces which are not suitable for machine learning (ML) type architectures.

Cloudification: Cloudification is conversion and/or migration of data and application programs in order to make use of cloud computing. The cloudification of architectures coupled with digitization of data has resulted in "mapping" architectures that enable the radio mapping of the RF environments.

Referring now to the drawings, and more particularly to FIGS. 1 through 10, where similar reference characters denote corresponding features consistently throughout the figures, there are shown preferred embodiments.

FIG. 1 is a block diagram 100 that illustrates one or more Radio parameters that affect signal quality from a base station 102 to a User Equipment (UE) 104 and from the UE 104 to the base station 102 according to some embodiments herein. The block diagram 100 includes the base station 102 and the user equipment 104. The one or more Radio parameters include height of the base station 102 from ground referred to as H, height of the user equipment 104 from the ground referred as h and distance between the user equipment 104 and the base station 102 referred as D. The block diagram 100 refers to a signal that is received from the base station 102 at the user equipment 104 and quality of signal that is received from the user equipment 104 at the base station 102.

Figure 2:
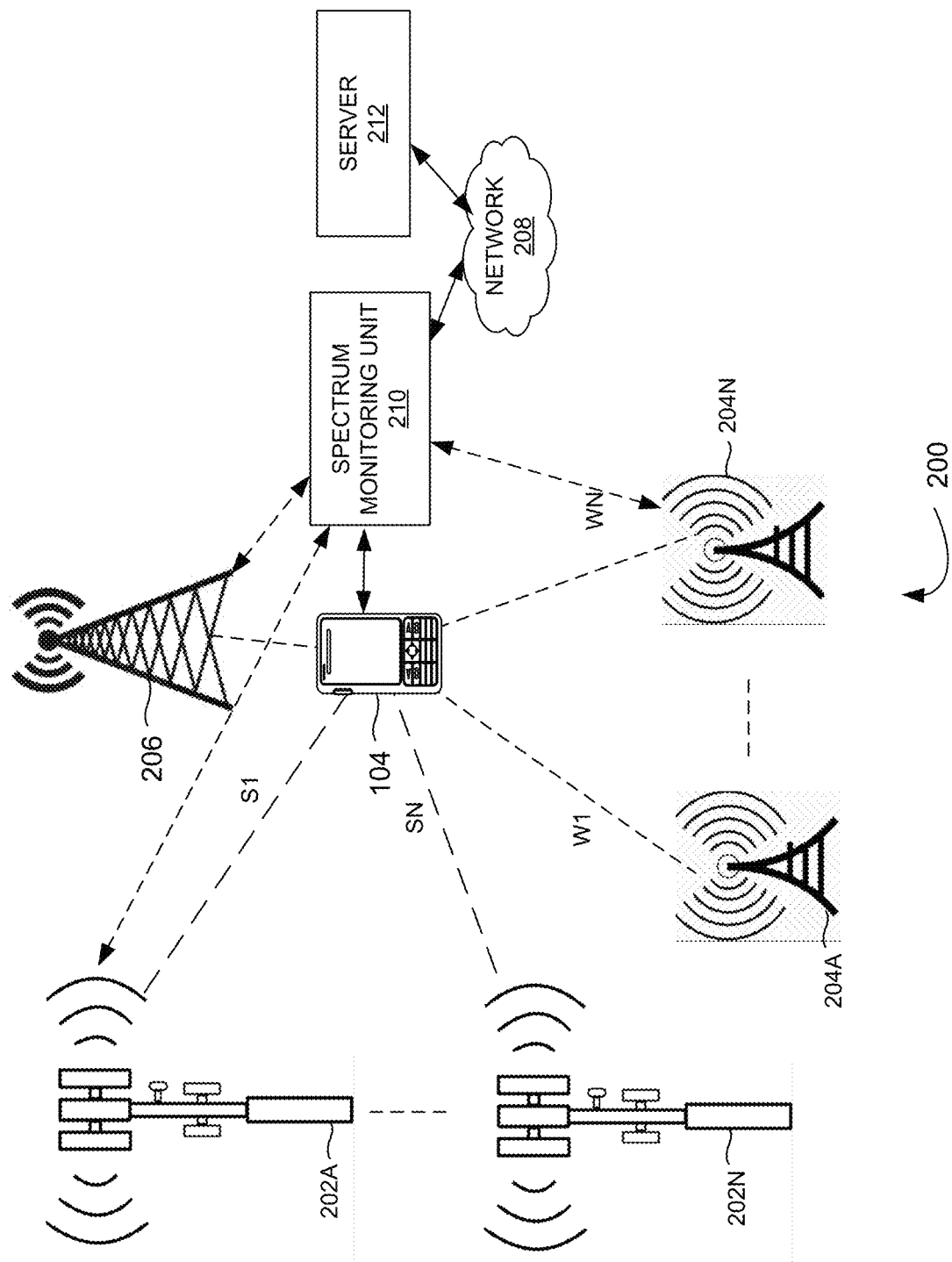
FIG. 2 is a block diagram that illustrates a signal received at the User Equipment (UE) in presence of simultaneous transmission from one or more base stations and one or more wireless access points according to some embodiments herein.

FIG. 2 is a block diagram 200 that illustrates a signal received at the user equipment 104 in presence of simultaneous transmission from one or more base stations 202A-N and one or more wireless access points 204A-N according to some embodiments herein. The block diagram 200 includes the user equipment 104, the one or more base stations 202A-N, the one or more wireless access points 204A-N, a Digital Terrestrial Television (DTT) transmitter 206, a network 208, a spectrum monitoring unit 210 and a server 212. The block diagram 200 refers signals received at the user equipment 104 from the one or more base stations 202A-N, the one or more wireless access points 204A-N and the DTT transmitter 206. In some embodiments, a signal received from a base station 202A at the user equipment 104 differs from the signals received from other base stations and the one or more wireless access points 204A-N.

The spectrum monitoring unit 210 directly sniffs the signals from the UE 104, the one or more base stations 202A-N, the DTT transmitter 206 and the one or more wireless access points 204A-N and connected to the server 212 through the network 208. In some embodiments, the network 208 is a wired network. In some embodiments, the network 208 is a wireless network. In some embodiments, the spectrum monitoring unit 210, whose "D" and "h" is known a-prior, monitors signal levels received from the one or more base stations 202A-N in its vicinity. In some embodiments, this information, along with the information gathered from one or more user equipment's present in its vicinity may estimate on-field radiation patterns of a Base Station antenna, determine the signal levels and noise and interference levels, signal path delays, network congestion, etc. Further details on the one or more Radio parameters that are extracted are described later.

Figure 3:
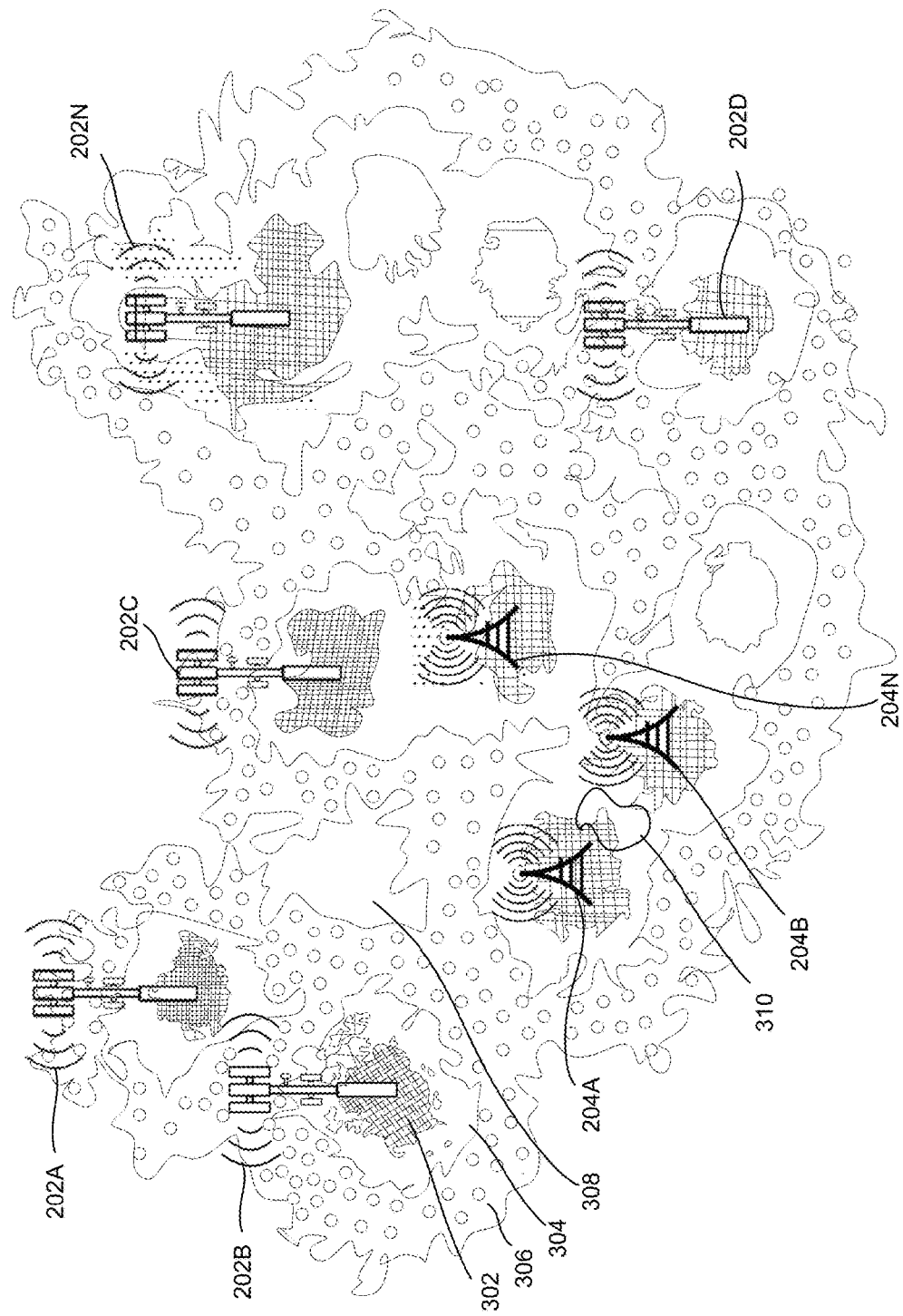
FIG. 3 is an exemplary view that illustrates a geographical representation of a location that includes the one or more base stations and the one or more wireless access points and variations in RF conditions according to some embodiments herein.

FIG. 3 is an exemplary view 300 that illustrates a geographical representation of a location that includes the one or more base stations 202A-N and the one or more wireless access points 204A-N and variations in Radio Frequency (RF) conditions according to some embodiments herein. The exemplary view 300 illustrates signal strengths as seen by a receiver between signals of the one or more base stations 202A-N and the one or more wireless access points 204A-N. In some embodiments, interference and signal strength is increased if a number of sources is increased. In some embodiments, areas that are near to the one or more base stations 202A-N and the one or more wireless access points 204A-N have highest signal strength. In some embodiments, the signal strength varies due to a lot of factors, e.g. the presence of walls, a number of user devices, etc. In some embodiments, real-time interference remains unknown. In some embodiments, a region 302 which includes high signal strength or good coverage area, a region 304 which includes medium signal strength or moderate coverage area, a region 306 which includes low signal strength or weak coverage are and a region 308, which has no coverage. In some embodiments, there exists a region 310 where receiver experiences high interference between two base stations or two wireless access points, e.g. a wireless access point 204A and a wireless access point 204B.

Figure 4:
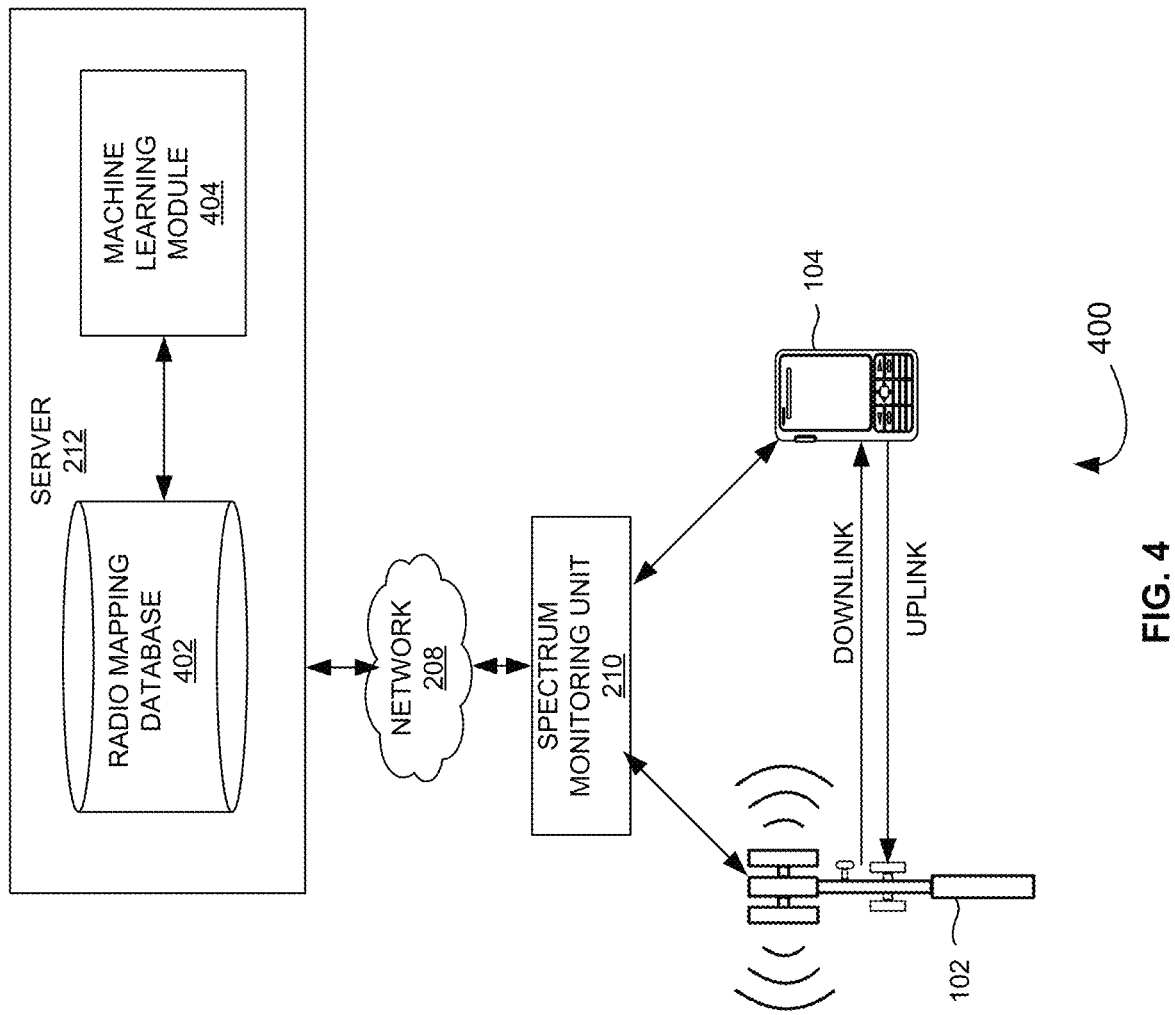
FIG. 4 is a block diagram of a radio mapping architecture according to some embodiments herein.

FIG. 4 is a block diagram of a radio mapping architecture 400 according to some embodiments herein. The radio mapping architecture 400 includes the base station 102, the user equipment (UE) 104, the network 208, the spectrum monitoring unit 210 and the server 212. The server 212 includes a radio mapping database 402 and a Machine Learning (ML) module 404. In some embodiments, the radio frequency is herein after referred to as RF. In some embodiments, Machine Learning is herein after referred to as ML. The UE 104 includes capability of performing measurements of one or more Radio parameters. In some embodiments, the one or more Radio parameters have been further elaborated in the subsequent sections.

The spectrum monitoring unit 210 captures the one or more Radio parameters and continuously monitors the one or more Radio parameters. In some embodiments, the spectrum monitoring unit 210 of the radio mapping architecture 400 may be connected through a radio network parameter monitoring system. In some embodiments, the radio mapping architecture 400 may be embedded in all wireless systems as a hardware or a software component.

In some embodiments, the spectrum monitoring unit 210 has a high-performance receive chain to allow precise measurements as compared to a typical commercial UE. In some embodiments, the spectrum monitoring unit 210 has a higher performance interference canceller that is used to notch/cancel interferers and estimates the interferers. In some embodiments, geographical location of the spectrum monitoring unit 210 is precisely known. The geographical location of the spectrum monitoring unit 210 may serve as a reference point to calibrate all location determining algorithms based on an error between a measured location and an actual location.

In some embodiments, one or more spectrum monitoring units are connected in the network 208 to continuously monitor the one or more Radio parameters and store the one or more Radio parameters in the radio mapping database 402. In some embodiments, the one or more spectrum monitoring units connected in the network 208 may provide services to users through a standardized Application programming interface (API).

The spectrum monitoring unit 210 stores the one or more Radio parameters in the radio mapping database 402. The spectrum monitoring unit 210 extracts the one or more Radio parameters that correspond to the one or more base stations 202 A-N and the UE 104 to derive an input schema for the radio mapping database 402 and periodically updates extracted parameters in the radio mapping database 402. The input schema for the radio mapping database 402 is updated with the one or more Radio parameters sensed by at least one of the spectrum monitoring unit 210 and the UE 104. The input schema is a database schema of the radio mapping database 402 and describes a structure of the radio mapping database 402.

The input schema derived by the spectrum monitoring unit 210 from the one or more Radio parameters include one or more location parameters, one or more RF parameters, one or more network parameters and one or more physical layer parameters. The one or more location parameters include time of measurement, latitude, longitude, altitude and Dilution of Precision (DoP). The one or more RF parameters include Channel Impulse Response (CIR), Receive Strength Indicator (RSSI), Reference Signal Receive Power RSRP, Reference Signal Received Quality RSRQ, Signal-to-Interference-plus-Noise Ratio (SINK), an adjacent channel interferer level, a channel model, transmitter power and carrier frequency. The one or more RF parameters are Geo-tagged and time-stamped. The one or more network parameters include model of the UE 104, base stations (BTS) which are visible to the UE 104, Public Land Mobile Network (PLMN) identity, Type Allocation Code (TAC), Carrier Aggregation (CA) configuration and Physical Cell ID (PCI). The one or more physical layer parameters include Hybrid automatic repeat request (HARM), Rank, Block Error Rate (BLER), jitter and call muting.

The one or more Radio parameters include height of the measurement (r, theta, phi) of the base station 102 and the UE 104 above ground, time of the day, antenna configuration (Antenna Gain pattern in Elevation and Azimuth), and information of terrain and radio infrastructure information and the radio environment to calculate the CIR on an uplink.

The Channel Impulse Response (CIR) of a dynamic Radio Frequency (RF) environment, is an output when presented with a brief input signal, called an impulse. In some embodiments, an impulse response is a reaction of a dynamic radio frequency RF environment in response to some external change. In some embodiments, the channel impulse response describes reaction of the dynamic radio frequency RF environment as a function of time or possibly as a function of some other independent variable that parameterizes a dynamic behavior of the radio frequency RF environment. In some embodiments, delay spread and coherence time of a channel are important parameters that affect the CIR and needs to be characterized.

The Channel Impulse Response (CIR) may be modeled as a transversal filter. Thus, length and coefficients of the transversal filter can fully specify a given channel. In some embodiments, the CIR is a sequence of complex numbers describing a tail of the impulse response of the channel as a function of time. Frequency domain characterization can also be done.

The Channel State Information (CSI) for a Massive multiple-input and multiple-output (MIMO) system that refers to a m×n channel matrix (H) that maps "m" transmit chains to "n" receive chains. In some embodiments, significant compression in both the CIR and the CSI information are achieved by associating at least one commonly occurring pattern with "index" values. In some embodiments, the index values are used to communicate or store CIR and CSI with low latency, bandwidth and storage.

The Receive Strength Indicator (RSSI) is a measurement of a signal is received by the user equipment (UE) 104 from the base station 102 or a wireless access point. The RSSI is a value that is used for determining if the UE 104 includes enough signal to obtain a good mobile wireless network connection. The Signal-to-Interference-plus-Noise Ratio (SINR) is defined as a power of an RF signal of interest divided by the sum of an interference power (from all the other interfering signals) and a power of some background noise. In some embodiments, adjacent channel interferer levels are an interference caused by extraneous power from the RF signal in an adjacent channel, which needs to be rejected by the receiver chain.

The server 212 includes the Machine Learning (ML) module 404 is used train to a Machine Learning model based on the one or more Radio parameters stored in the radio mapping database 402. The ML module 404 predicts one or more dynamically changed parameters from the input schema that is stored in the radio mapping database 402 to derive an output schema based on the ML model. In some embodiments, the ML module 404 determines the one or more dynamically changed parameters with respect to time.

In some embodiments, the output schema derived from the one or more dynamically changed parameters includes latitude, longitude, altitude, and predicted Radio parameters. In some embodiments, the predicted Radio parameters include the Channel state information (CSI), the Reference Signal Receive Power (RSRP), the Reference Signal Received Quality (RSRQ), the Signal-to-interference-plus-noise ratio (SINR), a channel model and a channel matrix.

The ML module 404 updates the one or more dynamically changed parameters in the radio mapping database 402. In some embodiments, the ML module 404 updates the one or more dynamically changed parameters in the radio mapping database 402 to design an optimal wireless network.

The ML module 404 dynamically refines the ML Model based on the one or more Radio parameters or the extracted parameters. The ML module 404 generates triggers to the spectrum monitoring unit 210 and the UE 104 to update the one or more Radio parameters stored in the radio mapping database 402.

In some embodiments, the ML module 404 periodically sends the triggers to the UE 104 to send the current channel state information (CSI) corresponds to the location of the UE 104 and updates the radio mapping database 402 with the current channel state information received from the UE 104. In some embodiments, the ML module 404 periodically sends the triggers to the UE 104 to send the current channel state information (CSI) on demand. In some embodiments, analytics components use the CSI and update the radio mapping database 402 with the updated CSI.

In some embodiments, the radio mapping database 402 includes extrapolated CSI to a fine resolution on each point in a coverage area. In some embodiments, the CSI is extrapolated by (i) sampling the coverage area around one or more sampling points, (ii) selecting a sampling point based on a nature of the one or more RF parameters that are stored in the radio mapping database 402 and (iii) interpolating the CSI if a selected sampling point is within the one or more sampling points or extrapolating the CSI if the selected sampling point is not in the one or more sampling points.

In some embodiments, the ML module 404 selects the sampling point using algorithms used in a computation. In some embodiments, the ML module 404 samples the coverage area around the location by sub-dividing the coverage area into grids. In some embodiments, size of a grid is configurable and decided based on at least one of (i) frequency of interest, and (ii) a terrain which affects radio propagation. In some embodiments, the ML module 404 derives the CSI within the grid using a simulation tool.

In some embodiments, the ML Module 404 estimates doppler shifts when the base station 102 identifies that the UE 104 is moving. The radio mapping database 402 includes a location information of the one or more base stations 202A-N and a nature of reference signals being emitted from the one or more base stations 202A-N. In some embodiments, if the coverage in a close vicinity of the location includes measured information which is stored in the radio mapping database 402, the ML module 404 interpolates the coverage in the close vicinity to cover a desired location using one or more methods such as ray tracing and other RF prediction tools.

In some embodiments, the ML module 404 determines movement of the UE 104 using at least one of (i) changes in Global Navigation Satellite System (GNSS) coordinates, (ii) the predicted Radio parameters or (iii) inertial sensors associated with the UE 104 if the GPS coordinates are available at the UE 104.

In some embodiments, the ML model 404 determines the location of the UE 104 based on a combination of Observed Time Difference of Arrival (OTDOA) algorithms and Bluetooth low energy (BLE) or Wi-Fi based beacons that are available, if the GPS coordinates are not available at the UE 104.

In some embodiments, the ML module 404 determines the location of the UE 104 based on the Observed Time Difference of Arrival (OTDOA) algorithms by (i) obtaining an information of reference signals that are emitted from the one or more base stations 202A-N and (ii) determining, using triangulation, the location of the UE 104 based on the information obtained from the UE 104. In some embodiments, the information includes a time interval measured between a first received signal and subsequent reference signals received at the UE 104 from the one or more base stations 202A-N. In some embodiments, the ML module 404 determines the location of the UE 104 using the triangulation based on geographic information for a given area and multi-path propagation. In some embodiments, each base station transmitter associated with the one or more base stations 202A-N emits a "cell-specific" reference signal. In some embodiments, a receiver that receives the reference signals from the one or more base stations 202A-N in its close proximity and measures the time interval between the first received signal such as a reference signal received from a closest base station and subsequent reference signals.

In some embodiments, if the base station 102 or eNodeB needs to beamform to the UE 104, the base station 102 (i) requests the UE 104 to send location information to the base station 102, (ii) uses the location information and queries the radio mapping database 402 for the current state information (CSI) and (iii) uses the CSI retrieved from the radio mapping database 402 to beamform. In some embodiments, beamforming is a technique that focuses a wireless signal towards a specific receiving device, rather than having the signal spread in all directions from a broadcast antenna.

In some embodiments, IoT oriented communication links such as NB-IoT or LoRa are used for communicating the UE 104 location and RF measurement data in an uplink and broadcast technologies such as ATSC-3.0 or DVB-T2 are used for communicating channel state information in a downlink.

In some embodiments, a cellular core network that queries the radio mapping database 402 for a predicted base station to serve the UE 104 and improve a handoff performance. The ML module 404 exchanges the one or more Radio parameters between the radio mapping database 402 with the cellular core network. In some embodiments, the cellular core network accesses the radio mapping database 402 through predefined Application Programming Interfaces (APIs). In some embodiments, the radio mapping database 402 supports a set of queries to retrieve and store the one or more Radio parameters. In some embodiments, a virtualized core component in an EPC (Packet Core) or a 5G core, interfaces to the radio mapping database 402. In some embodiments, a cloud-based application provides a set of APIs to access the one or more Radio parameters from the radio mapping database 402.

In some embodiments, if the UE 104 moves from the location, the ML module 404 assigns the UE 104 to a new base station that is predicted by the ML module 404 to serve the UE 104. The ML module 404 the predicts the base station 102 to serve the UE 104 using at least one of (i) a Radio Access Technology, e.g., a Wi-Fi, a cellular frequency bands and the like, (ii) an optimal beam shape that is synthesized by the base station 102 or (iii) an access point to serve the location. The ML module 404 communicates an access information that corresponds to the access point, to the UE 104 over an Ultra-High Frequency (UHF) broadcast link, e.g., ATSC 3.0/DVB-T2, where significant spectrum is available and propagation characteristics being more benign.

The ML module 404 designs a group of signal waveforms to provide optimum performance to the UE 104 at the location based on the dynamically predicted Radio parameters and the one or more Radio parameters correspond to the location of the UE 104 stored at the radio mapping database 402. In case of high interference areas, a class of Dynamic Interference-aware waveforms are designed that permit simplified mechanisms of interference mitigation, such as Successive Interference Cancellation or Enhanced Intercell Interference Coordination, whenever both an aggressor and victim nodes are associated with the radio mapping architecture 400 described by this embodiment.

In some embodiments, the radio mapping architecture 400 includes a wideband spectrum monitoring unit that collects parameters of interest and a platform as one or more software APIs serving as a radio platform which allows users to access data from the radio mapping database 402 through the radio platform as a service.

The ML module 404 generates a Radio parameter prediction model based on the ML model generated by the ML module 404. The ML module 404 accepts updated Radio parameters if there is a change in at least one of the location of the UE 104 or RF environment that are sensed by the UE 104. The ML module 404 refines the Radio parameter prediction model based on the updated Radio parameters. The ML module 404 updates the predicted Radio parameters in the radio mapping database 402 for a given location of the UE 104 using a refined Radio parameter prediction model.

Figure 5A:
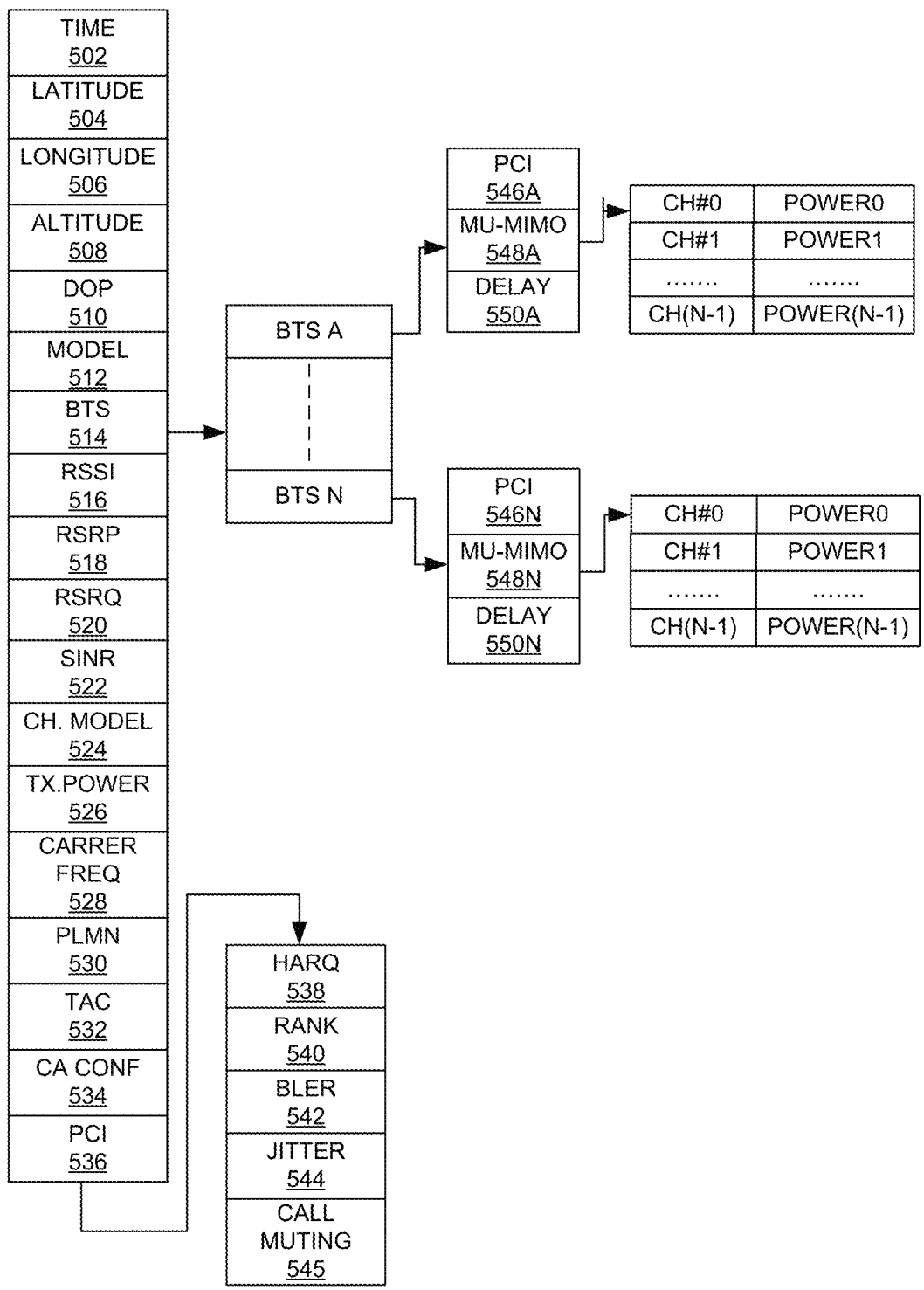
FIG. 5A is a table view that illustrates an input schema stored in a radio mapping database of FIG. 4 according to some embodiments herein.

FIG. 5A is a table view that illustrates an input schema 500 stored in the radio mapping database 402 of FIG. 4 according to some embodiments herein. The input schema 500 derived by the spectrum monitoring unit 210 from one or more Radio parameters include one or more location parameters, one or more RF parameters, one or more network parameters and one or more physical layer parameters. The one or more location parameters include time of measurement 502, latitude 504, longitude 506, altitude 508 and Dilution of Precision (DoP) 510 as determined by an integrated GNSS module of the UE 104 or the spectrum monitoring unit 210. The one or more RF parameters Channel Impulse Response (CIR), a Receive Strength Indicator (RSSI) 516, a RSRP 518, a RSRQ 520, a Signal-to-Interference-plus-Noise Ratio (SINR) 522, an adjacent channel interferer level, a channel model 524, transmitter power 526 and carrier frequency 528.

The one or more network parameters include model of the UE (indicating its communication and measurement capability) 512, base stations (BTS) 514 which are visible to the UE 104, Public Land Mobile Network (PLMN) identity 530, Type Allocation Code (TAC) 532, Carrier Aggregation (CA) configuration 534 and Physical Cell ID (PCI) 536. The one or more physical layer parameters include Hybrid automatic repeat request (HARM) 538, rank 540, Block Error Rate (BLER) 542, jitter 544 and call muting 545.

In some embodiments, the one or more Radio parameters are determined by the User Equipment (UE) 104 and the spectrum monitoring unit 210 is shown in FIG. 4. The quantities shown are exemplary, corresponding to a 4G network. In some embodiments, some of the parameters may change for a 2G, 3G, 5G or Wi-Fi networks. In some embodiments, a different set of parameters are used even for a 4G network.

The model 512 refers to a model number of a measuring device, e.g. type of the spectrum monitoring unit 210, a mobile phone model, i.e. TM type is also captured. The base station (BTS) 514 denotes a number of base stations, whose signals are detectable at the measuring device. The base station (BTS) 514 includes one or more base station, e.g. BTS A-N. Each base station includes Physical Cell Identity (PCI). e.g. PCI 546A corresponding to the base station, etc and a delay 550A associated with propagation time from the base station, e.g. the BTS A to the measuring unit. In some embodiments, the base stations 514 may include multi-user multiple input multiple output (MU-MIMO) capability, e.g. MU-MIMO 548A. In such cases, power levels associated with each of visible beamlets may be separately measured.

Figure 5B:
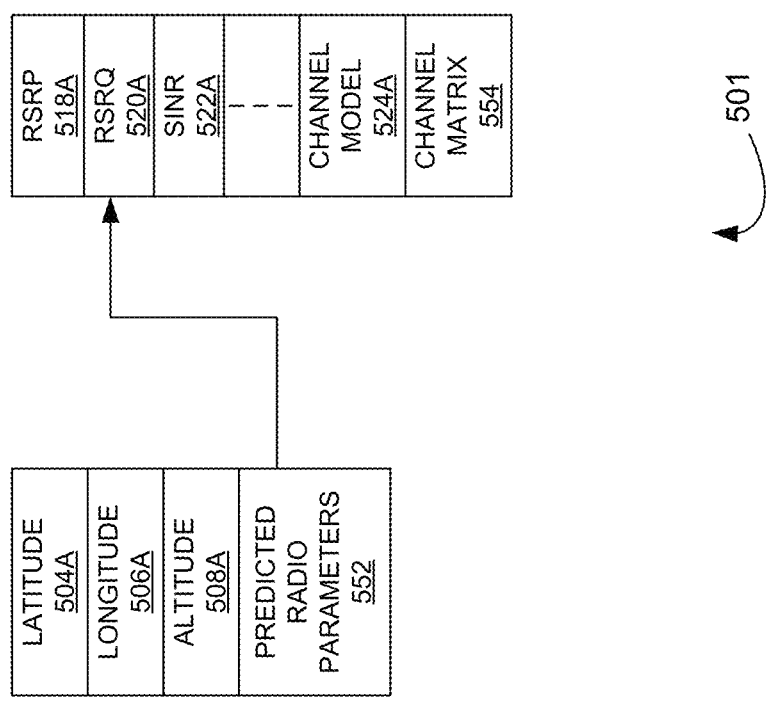
FIG. 5B is a table view that illustrates an output schema from a Machine Learning (ML) module of FIG. 4 according to some embodiments herein.

FIG. 5B is a table view 501 that illustrates an output schema from the ML module 404 of FIG. 4 according to some embodiments herein. The output schema 501 includes latitude 504A, longitude 506A, altitude 508A, and predicted radio parameters 552. In some embodiments, the predicted radio parameters 552 includes RSRP 518A, RSRQ 520A, SINR 522A, a channel model 524A and a channel matrix 554.

Figure 6:
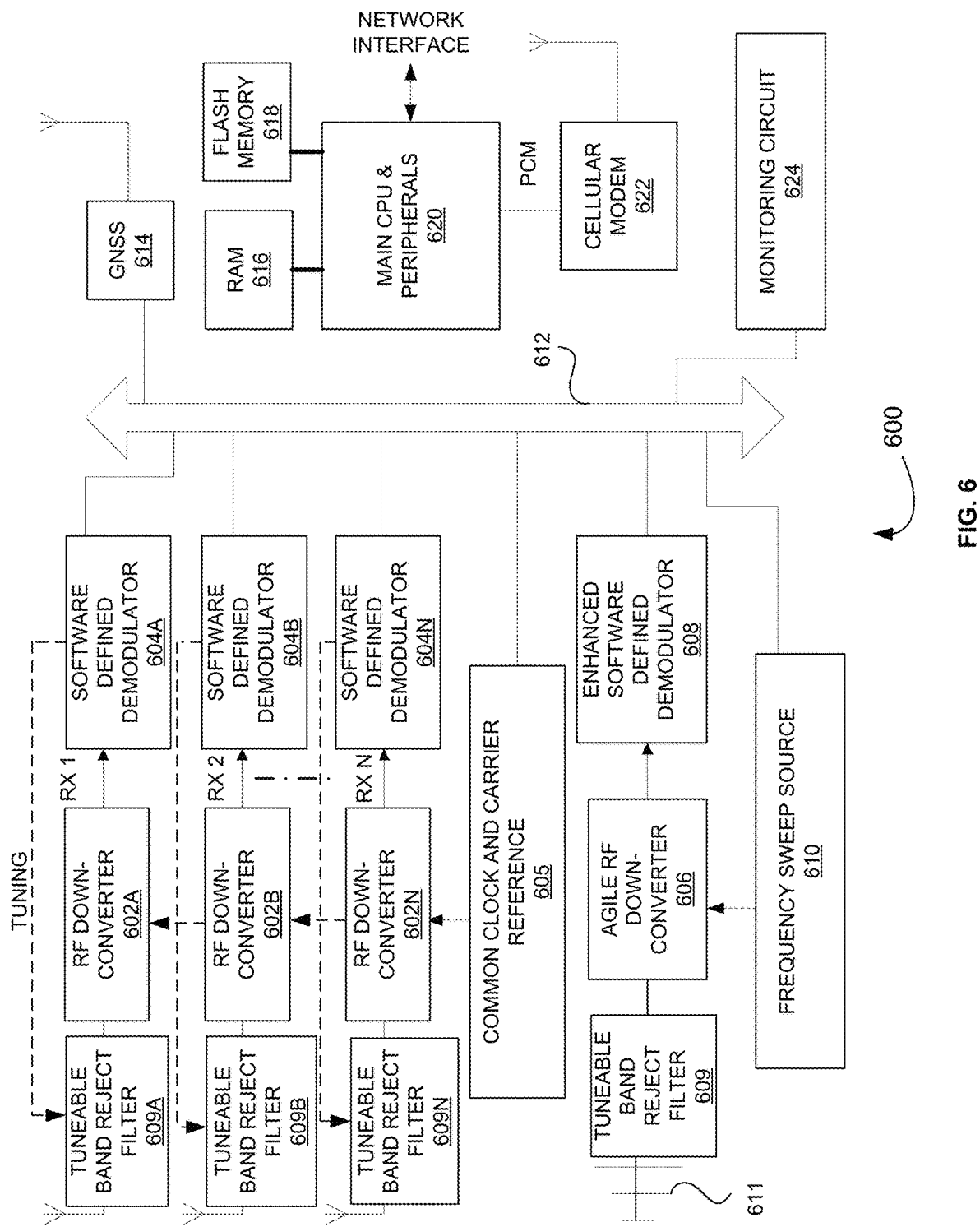
FIG. 6 is a block diagram showing a typical example of sub-blocks of a spectrum monitoring unit of FIG. 4 according to some embodiments herein.

FIG. 6 is a block diagram 600 showing a typical example of sub-blocks of the spectrum monitoring unit 210 of FIG. 4 according to some embodiments herein. The block diagram 600 includes one or more RF Down converters 602A-N, one or more software-defined demodulators 604A-N, a common clock and carrier reference 605, an agile RF down-converter 606, an enhanced software-defined demodulator 608, one or more tunable band reject filters 609A-N, a frequency sweep source 610, an antenna 611, a control and synchronous bus 612, a Global Navigation Satellite System (GNSS) module 614, a Random-Access Memory (RAM) 616, a flash memory 618, a main CPU and peripherals 620, a cellular modem 622 and a monitoring circuit 624.

The RF down converters 602A-N include a common frequency and timing reference 605. The one or more software-defined demodulators 604A-N captures a significant part of a radio frame, in a form of I and Q samples, which are transferred to the Main CPU and peripherals 620.

The one or more software-defined demodulators 604A-N and the enhanced software-defined demodulator 608 capture post data. The main CPU and peripherals 620 processes I and Q samples in non-real time. This permits exploitation of more advanced algorithms which are yet to be exploited in cellular standards due to difficulties in real time implementations. For example, successive interference cancellation may be used to detect weak signals hidden underneath stronger signals, which may be missed out by conventional cellular receivers. In some embodiments, for reference signals, due to the apriori information of the signal and the location of the transmitter, deeply embedded signals information is determined.

The Main CPU and peripherals 620 analyses data in non-real-time by realizing a "synthetic aperture" software receiver for realization of beamforming. In some embodiments, the Main CPU and peripherals 620 realizes highly directed receive antenna that are steered through a horizon electronically.

The agile RF down-converter 606 used in stand-alone mode to (i) capture RF signals at different carrier frequencies and (ii) determine channel leakages. In some embodiments, the agile RF down-converter 606 analyses different RF communication standards in parallel. The frequency sweep source 610 along with the agile RF down-converter 606 allows the Enhanced Software-Defined Demodulator 608 to scan a wide range of frequencies in a given location. In some embodiments, the one or more tuneable band reject filters 609A-N that reject unwanted narrowband interference signals. The antenna 611 senses the RF signal at multiple polarization angles.

In some embodiments, the agile RF down-converter 606, the enhanced software-defined demodulator 608, the one or more tunable band reject filters 609A-N, and the frequency sweep source 610 are initially used for a preliminary analysis e.g. finding interfering signals after which array of receivers such as the one or more RF Down converters 602A-N and the one or more software-defined demodulators 604A-N are used for detailed analysis of an issue. The GNSS module 614 determines latitude, longitude and altitude of the given location. In some embodiments, the GNSS module 614 determines a GNSS error. The GNSS module 614 provides Dilution of Precision (DoP) which indicates an estimated error in Global Positioning System (GPS) values. The Random-access memory (RAM) 616 is a form of computer data storage that stores data and machine code currently being used. The flash memory 618 is an electronic (solid-state) non-volatile computer storage medium that is electrically erased and reprogrammed.

The cellular modem 622 is capable of making voice calls and data calls and measuring the Received signal strength indicator (RSSI) 516, the Reference Signal Receive Power (RSRP) 518, the Reference Signal Received Quality (RSRQ) 520, the Signal-to-interference-plus-noise ratio (SINR) 522, the Block Error Rate (BLER) 542, the Packet Jitter 544, the call muting 545 etc. In some embodiments, the monitoring circuit 624 is added if physical and medium access layer parameters of commercial cellular modems for the UE 104 are not exposed to an application software. The monitoring circuit 624 snoops an uplink control signaling to detect events such as schedule requests, incidences of Acknowledgment (ACK), Negative Acknowledgment (NACK) and the Hybrid automatic repeat request (HARQ) 538. In some embodiments, high incidence of the HARQ 538 indicates high congestion in an entire cluster of base stations or some issues in network planning. In some embodiments, the spectrum monitoring unit 210 includes an event logger that captures the detected events such as the schedule requests, the incidences of ACK, the NACK and the HARQ 538 and generates the triggers to update one or more Radio parameters stored in the radio mapping database 402 based on an occurrence of specific combinations of the events.

The spectrum monitoring unit 210 may incorporate elements of edge analytics for detecting error propagation, where multiple events are detected corresponding to a single root cause. In some embodiments, spectrum monitoring unit 210 may notify major errors leading to a significant service disruption to operation support subsystems.

In some embodiments, the spectrum monitoring unit 210 may be configured as a transmitter, whose signals may be monitored by other such units in near vicinity. The spectrum monitoring unit 210 may virtually determine all the RF parameters for radio sounding activities to characterize the radio environment in a particular location. In some embodiments, the determined RF parameters are used by the ML module 404 to determine the RF coverage in locations where there is inadequate measured data. In some embodiments, sounding signals, both standards defined and proprietary, are used for the radio sounding activities.

In some embodiments, the spectrum monitoring unit 210 is a portable unit. In some embodiments, the spectrum monitoring unit 210 is deployed on public transport vehicles, e.g., busses, trains, taxis or even private vehicle, which allows rapid gathering of data in a short time with a number of units.

Figure 7:
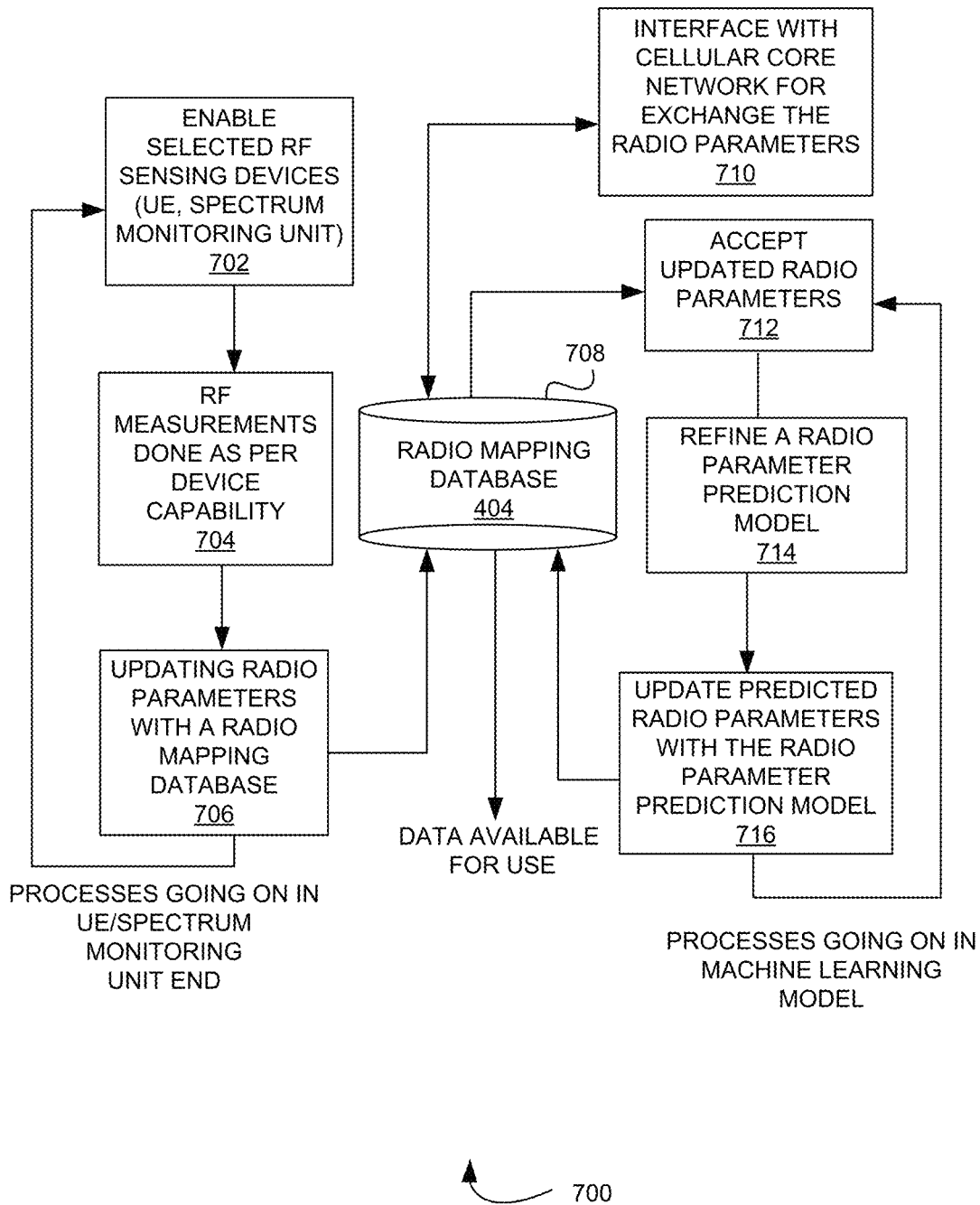
FIG. 7 is a flow diagram that illustrates a method of populating a radio mapping database of a radio mapping architecture and updating predicted Radio parameters in the radio mapping database with updated Radio parameters according to some embodiments herein.

FIG. 7 is a flow diagram that illustrates a method 700 of populating and the radio mapping database 402 of the radio mapping architecture 400 and updating predicted Radio parameters in the radio mapping database 402 with updated Radio parameters according to some embodiments herein. At step 702, the method 700 includes enabling the spectrum monitoring unit 210 and the user equipment 104 to extract one or more Radio parameters. In some embodiments, the one or more Radio parameters include a Channel Impulse Response (CIR), (ii) a Receive Strength Indicator (RSSI), (iii) a Signal-to-Interference-plus-Noise Ratio (SINR) or a Signal to Noise Ratio (SNR), and (iv) an adjacent channel interferer levels. At step 704, the method 700 includes capturing the one or more Radio parameters from the user equipment 104 or the spectrum monitoring unit 210 based on a capability of the spectrum monitoring unit 210 and the UE 104. At step 706, the method 700 includes periodically updating the one or more Radio parameters in the radio mapping database 402. At step 708, the method 700 storing the one or more Radio parameters in the radio mapping database 402.

At step 710, the method 700 exchanging the one or more Radio parameters between the radio mapping database 402 with a cellular core network. In some embodiments, the cellular core network, a radio access network and a scheduler, access the radio mapping database 402 through predefined Application Programming Interfaces (APIs). In some embodiments, the cellular core network along with the base station 102 includes a large repository of information and an association of the cellular core network along with the base station 102 with the channel estimation and angle of arrival of uplink signals from the user equipment 104. These may act as an additional information source for the radio mapping database 402 apart from the UE 104 and the spectrum monitoring unit 210. In addition, the cellular core network may also access the information generated by the Machine Learning (ML) module 404 to improve performance of the cellular core network. At step 712, the method 700 includes generating a Radio parameter prediction model based on a Machine learning model generated by the ML module 404 and accepting updated Radio parameters if there is a change in at least one of a location of the UE 104 or RF environment that is sensed by the user equipment 104. At step 714, the method 700 includes refining the Radio parameter prediction model based on the updated Radio parameters. At step 716, the method 700 includes updating the predicted Radio parameters in the radio mapping database 402 for a given location of the UE 104 using a refined Radio parameter prediction model. In some embodiments, this process is going on until the ML module 404 becomes nearly ideally accurate.

In some embodiments, the ML module 404 includes machine learning functionalities that include, but are not restricted to functions related to selecting the optimal methodology for prediction for a given terrain, finding the optimum set of parameters that the model assumed in the methodology incorporates for performing the modeling tasks, classification of terrains from the 3D geographic information etc. In some embodiments, the ML module 404 includes Machine Learning algorithms may be in a form of heuristics or incorporate elements of soft computing (e.g. Neural networks including Tensor Flow, Genetic Algorithms, Simulated Annealing or even Quantum Computing) or a combination of both heuristics and soft computing.

Figure 8:
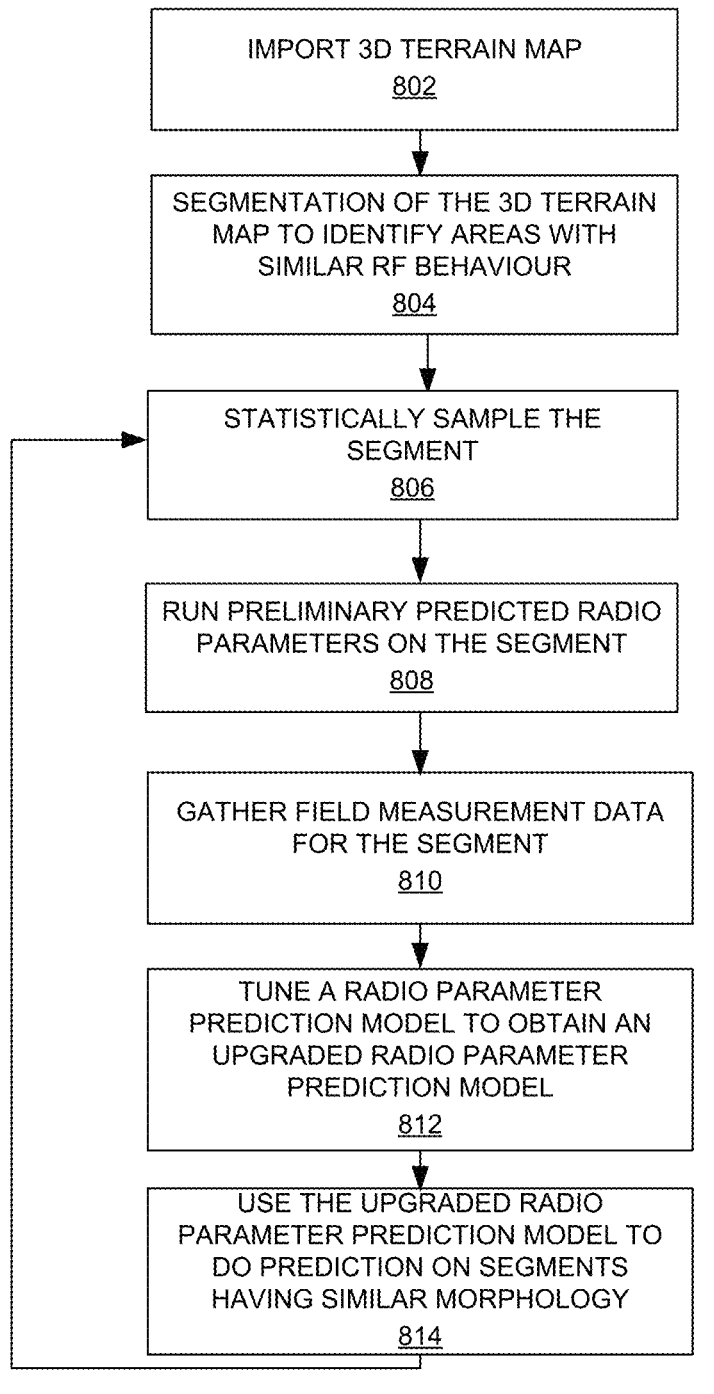
FIG. 8 is a flow diagram that illustrates a method of tuning a Radio parameter prediction Model of FIG. 7 according to some embodiments herein.

FIG. 8 is a flow diagram that illustrates a method 800 of tuning a Radio parameter prediction Model of FIG. 7 according to some embodiments herein. At step 802, the method 800 includes importing 3D terrain map. In some embodiments, the Radio parameter prediction model may consider addition, removal or equipment malfunction of cellular sites. At step 804, the method 800 includes segmenting the 3D terrain map to determine a segment that includes one or more areas with similar RF environment. At step 806, the method 800 statistically sampling the segment. At step 808, the method 800 includes running preliminary predicted Radio parameters on a sampled segment. The preliminary predicted Radio parameters are selected based on a best suited Radio parameter prediction model corresponding to the segment. At step 810, the method 800 includes gathering field measurement data for the segment. At step 812, the method 800 includes tuning the Radio parameter prediction Model with one or more Radio parameters to obtain an upgraded Radio parameter prediction model based on the segment. At step 814, the method 800 includes using the upgraded Radio parameter prediction model to perform prediction on the segments that have similar morphology.

Figure 9:
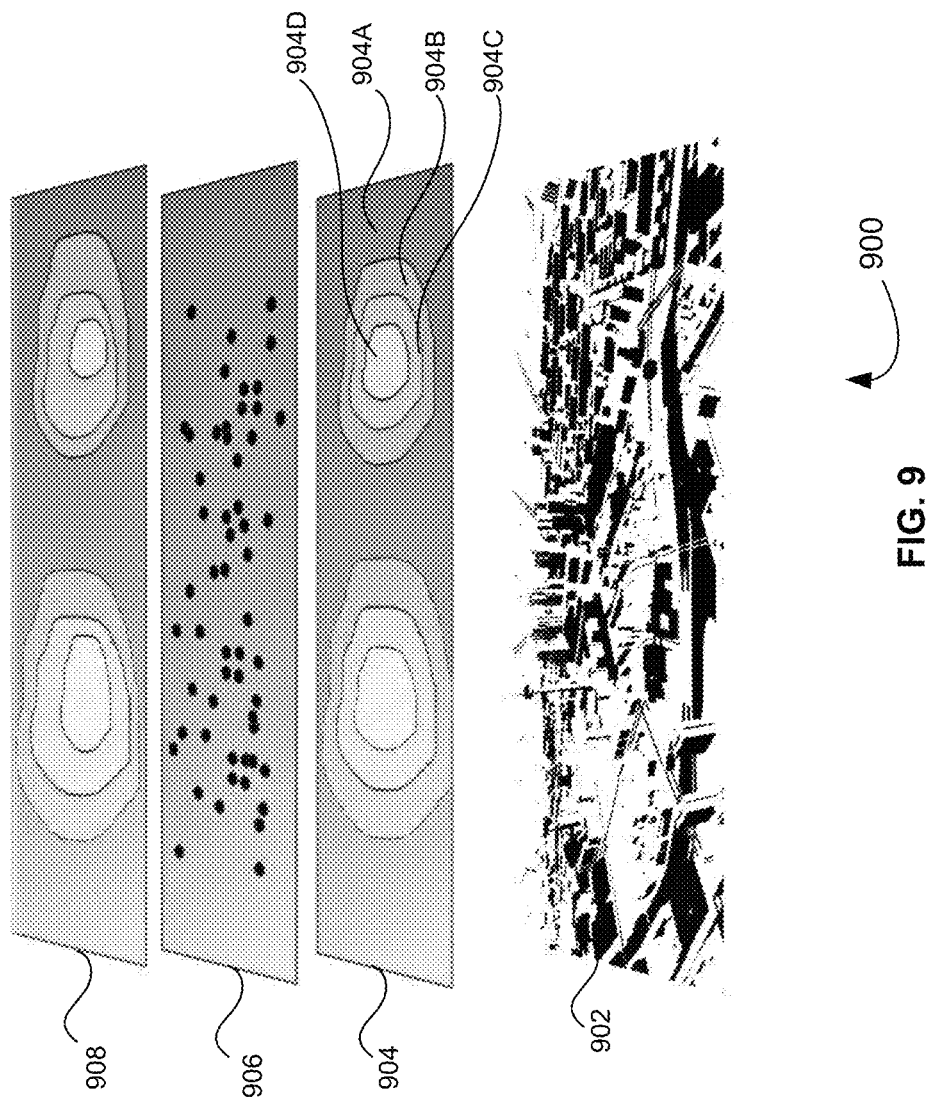
FIG. 9 is an exemplary view that illustrates layers of data that are over-laid over basic 3D terrain data for a given location stored in the radio mapping database by a Radio parameter prediction model according to some embodiments herein.

FIG. 9 is an exemplary view 900 that illustrates layers of data that are over-laid over basic 3D terrain data for a given location stored in the radio mapping database 402 by a Radio parameter prediction model according to some embodiments herein. The exemplary view 900 includes a first layer 902, a second layer 904, a third layer 906 and a fourth layer 908. The first layer 902 represents the 3D terrain data, the second layer 904 represents a first level of the Radio parameters prediction, the third layer 906 represents a measurement of sample points and the fourth layer 908 represents predicted Radio parameters based on an upgraded Radio parameter prediction model. The first layer 902 incorporates geographical features that affect RF propagation, which include foliage, knife edge diffraction from hills and buildings water bodies etc. In some embodiments, layers of data that are added over the traditional terrain data which is available from a Geographical Database. The depth of vegetation due to foliage loss is estimated based on vegetation mapping of a given region. In some embodiments, path loss that includes foliage and knife edge effects are accounted and stored in the Geographical database. In some embodiments, the impact of polarization of wave transmitted is also be accordingly accounted. The second layer 904 and the fourth layer 908 includes shaded regions that represent different signal strengths. In some embodiments, the shaded regions represent decreasing signal strength. For example, signal quality in the shaded region 904D is better than the signal quality of a shaded region 904C, while both have a better quality than the shaded region 904A.

Figure 10:
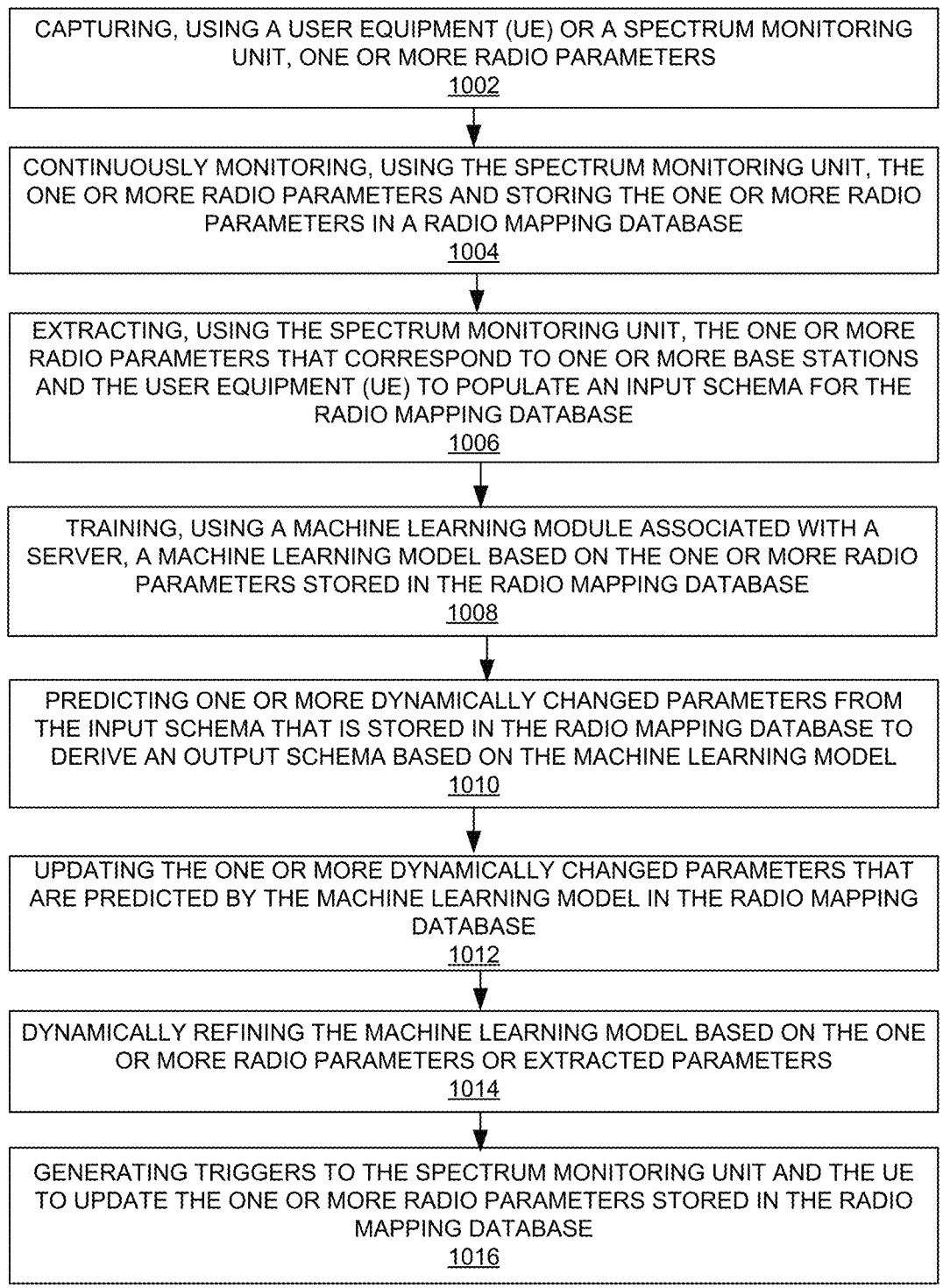
FIG. 10 is a flow diagram that illustrates a method of predicting one or more dynamically changed parameters using a radio mapping architecture according to some embodiments herein.

FIG. 10 is a flow diagram that illustrates a method 1000 of predicting one or more dynamically changed parameters using the radio mapping architecture 400 according to some embodiments herein. At step 1002, the method 1000 includes capturing, using at least one of the UE 104 or the spectrum monitoring unit 210, one or more Radio parameters. At step 1004, the method 1000 includes continuously monitoring, using the spectrum monitoring unit 210, the one or more Radio parameters and storing the one or more Radio parameters in the radio mapping database 402. At step 1006, the method 1000 includes extracting, using the spectrum monitoring unit 210, the one or more Radio parameters that correspond to the one or more base stations 202A-N and the User Equipment (UE) 104 to populate the input schema 500 for the radio mapping database 402 and periodically updating extracted parameters in the radio mapping database 402. At step 1008, the method 1000 includes training, using the Machine learning module 404 associated with the server 212, a Machine Learning model based on the one or more Radio parameters stored in the radio mapping database 402.

At step 1010, the method 1000 includes predicting the one or more dynamically changed parameters from the input schema 500 that is stored in the radio mapping database 402 to derive the output schema 501 based on the ML model. At step 1012, the method 1000 includes updating the one or more dynamically changed parameters that are predicted by the ML model in the radio mapping database 402. At step 1014, the method 1000 includes dynamically refining the ML Model based on the one or more Radio parameters or the extracted parameters. At step 1016, the method 1000 includes generating triggers to the spectrum monitoring unit 210 and the UE 104 to update the one or more Radio parameters stored in the radio mapping database 402.

Foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A radio mapping architecture for a wireless network, comprising:
a User Equipment (UE) that performs measurements of at least one Radio parameter; or
a spectrum monitoring unit that
captures at least one Radio parameter;
continuously monitors the at least one Radio parameter and stores the at least one Radio parameter in a radio mapping database;
extracts the at least one Radio parameter that corresponds to at least one base station and the User Equipment (UE) to populate an input schema for the radio mapping database and periodically updates extracted parameters in the radio mapping database, wherein the input schema is a database schema of the radio mapping database and describes a structure of the radio mapping database;
a server that comprises the radio mapping database that periodically captures the at least one Radio parameter from the UE and the spectrum monitoring unit, wherein the radio mapping database captures the extracted parameters and geo-tagged results periodically from the spectrum monitoring unit, wherein the input schema for the radio mapping database is updated with the at least one Radio parameter sensed by at least one of (i) the spectrum monitoring unit and (ii) the UE; and
a Machine Learning (ML) module that is used to
train a Machine Learning model based on the at least one Radio parameter stored in the radio mapping database;
predict at least one dynamically changed parameter from the input schema that is stored in the radio mapping database to derive an output schema based on the ML model;
update the at least one dynamically changed parameter that is predicted by the ML model in the radio mapping database;
dynamically refine the ML Model based on the at least one Radio parameter or the extracted parameters; and
generate triggers to the spectrum monitoring unit and the UE to update the at least one Radio parameter stored in the radio mapping database, wherein the Machine Learning module designs a group of signal waveforms to provide optimum performance to the UE at a location based on the dynamically predicted Radio parameters and the at least one Radio parameter corresponds to the location of the UE stored at the radio mapping database.

2. The radio mapping architecture of claim 1, wherein the input schema derived by the spectrum monitoring unit from the at least one Radio parameter comprises at least one location parameter, at least one RF parameter, at least one network parameter and at least one physical layer parameter.

3. The radio mapping architecture of claim 2, wherein the at least one location parameter comprises time of measurement, latitude, longitude, altitude and Dilution of Precision (DoP), wherein the at least one RF parameter comprises Channel Impulse Response (CIR), Receive Strength Indicator (RSSI), Reference Signal Receive Power (RSRP), Reference Signal Received Quality (RSRQ), Signal-to-Interference-plus-Noise Ratio (SINR), an adjacent channel interferer level, a channel model, transmitter power and carrier frequency, wherein the at least one RF parameter is Geo-tagged and time-stamped, wherein the at least one network parameter comprises model of the UE, base stations (BTS) which are visible to the UE, Public Land Mobile Network (PLMN) identity, Type Allocation Code (TAC), Carrier Aggregation (CA) configuration and Physical Cell ID (PCI), wherein the at least one physical layer parameter comprises Hybrid automatic repeat request (HARQ), Rank, Block Error Rate (BLER), jitter and call muting.

4. The radio mapping architecture of claim 3, wherein the base station (BTS) denotes the number of base stations that comprise Physical Cell Identity (PCI) and a delay associated with propagation time from a base station to the spectrum monitoring unit, wherein the base stations comprise multi-user multiple input multiple output (MU-MIMO) capability.

5. The radio mapping architecture of claim 1, wherein the output schema derived from the at least one dynamically changed parameter comprises latitude, longitude, altitude, and predicted Radio parameters, wherein the predicted Radio parameters comprise RSRP, RSRQ, SINR, a channel model and a channel matrix.

6. The radio mapping architecture of claim 1, wherein the Machine Learning module periodically sends the triggers to the UE to send a current channel state information (CSI) corresponds to the location and updates the radio mapping database with the current channel state information received from the UE.

7. The radio mapping architecture of claim 1, wherein the Machine Learning module estimates doppler shifts when the base station identifies that the UE is moving.

8. The radio mapping architecture of claim 1, wherein the Machine Learning module determines the movement of the UE using at least one of (i) changes in Global Navigation Satellite System (GNSS) coordinates, (ii) the predicted Radio parameters or (iii) inertial sensors associated with the UE if the GPS coordinates are available at the UE.

9. The radio mapping architecture (400) of claim 1, wherein if GPS coordinates are not available at the UE, the Machine Learning module determines the location of the UE based on a combination of Observed Time Difference of Arrival (OTDOA) algorithms and Bluetooth low energy (BLE) or Wi-Fi based beacons that are available.

10. The radio mapping architecture of claim 1, wherein if the base station needs to beamform to the UE, the base station (i) requests the UE to send location information of the UE, (ii) queries the radio mapping database for the current state information (CSI) based on the location information shared by the UE and (iii) uses the CSI retrieved from the radio mapping database to beamform.

11. The radio mapping architecture of claim 1, wherein the radio mapping database includes extrapolated CSI to a fine resolution on each point in a coverage area, wherein the CSI is extrapolated by (i) sampling the coverage area around one or more sampling points;
(ii) selecting a sampling point based on a nature of the at least one RF parameter that is stored in the radio mapping database; and
(iii) interpolating the CSI if a selected sampling point is within the one or more sampling points or extrapolating the CSI if the selected sampling point is not in the one or more sampling points.

12. The radio mapping architecture of claim 11, wherein the Machine Learning module samples the coverage area by sub-dividing the coverage area into grids, wherein size of a grid is configurable and decided based on at least one of (i) frequency of interest, and (ii) a terrain that affects radio propagation.

13. The radio mapping architecture of claim 1, wherein a cellular core network that queries the radio mapping database for a predicted base station to serve the UE.

14. The radio mapping architecture of claim 1, wherein the Machine Learning module
predicts the base station to serve the UE and stores the predicted base station at the radio mapping database, wherein the Machine Learning module predicts the base station to serve the UE using at least one of (i) a Radio Access Technology, (ii) an optimal beam shape that is synthesized by the base station or (iii) an access point to serve the location.

15. The radio mapping architecture of claim 1, wherein if the UE moves from the location, the Machine Learning module assigns the UE to anew base station that is predicted by the Machine Learning module to serve the UE, wherein the Machine Learning module communicates access information that corresponds to the access point predicted by the Machine Learning module, to the UE over an Ultra-High Frequency (UHF) broadcast link.

16. The radio mapping architecture of claim 1, wherein the spectrum monitoring unit comprises
a plurality of RF Down-converters that comprises a common frequency and timing reference;
a plurality of software-defined demodulators that captures a significant part of a radio frame, in a form of I and Q samples;
an agile RF down-converter that is used in stand-alone mode to (i) capture RF signals at different carrier frequencies and (ii) determine channel leakages, wherein the agile RF down-converter analyses different RF communication standards in parallel; and
a frequency sweep source associated with the agile RF down-converter enables an Enhanced Software-Defined Demodulator to scan a wide range of frequencies in a given location.

17. The radio mapping architecture of claim 1, wherein the spectrum monitoring unit comprises
a GNSS module that determines the latitude, the longitude, and the altitude of the location, wherein the GNSS module provides the Dilution of Precision (DoP) indicates an estimated error in GPS values;
a cellular modem that is capable of making voice calls and data calls to a network and measuring the Received signal strength indicator (RSSI), the Reference Signal Receive Power (RSRP), the Reference Signal Received Quality (RSRQ), the Signal-to-interference-plus-noise ratio (SINR), the Block Error Rate (BLER), the Packet Jitter and the call muting;
a monitoring circuit that snoops an uplink control signaling to detect events that comprise schedule requests, incidences of Acknowledgment (ACK), Negative Acknowledgment (NACK) and the Hybrid automatic repeat request (HARQ); and an event logger that captures the detected events from the monitoring circuit and generates the triggers to update the at least one Radio parameter stored in the radio mapping database based on an occurrence of specific combinations of the events, wherein the specific combinations of the events are related to network disruption, detection of jamming, interference detection or higher than expected traffic.

18. A method for populating a radio mapping database of a radio mapping architecture and updating predicted Radio parameters in the radio mapping database with updated Radio parameters, the method comprising:

enabling at least one of (i) a user equipment (UE) and (ii) a spectrum monitoring unit to extract at least one Radio parameter;

capturing the at least one Radio parameter from at least one of (i) the spectrum monitoring unit and (ii) the UE based on a capability of the spectrum monitoring unit and the UE;

periodically storing the at least one Radio parameter in the radio mapping database;

exchanging the at least one Radio parameter between the radio mapping database with a cellular core network, wherein the cellular core network along with the base station comprises a large repository of information that comprises an association of the cellular core network along with the base station with the channel estimation and angle of arrival of the uplink signals from the UE, wherein the radio mapping database captures the information from the cellular core network along with the base station;

generating a Radio parameter prediction model based on a Machine learning model generated by a Machine learning Module;

accepting the updated Radio parameters if there is a change in at least one of a location of the UE or RF environment that is sensed by the UE;

refining the Radio parameter prediction model based on the updated Radio parameters; and updating the predicted Radio parameters in the radio mapping database for a given location of the UE using a refined Radio parameter prediction model.

19. The method of claim 18, wherein the cellular core network, a radio access network and a scheduler, access the radio mapping database through predefined Application Programming Interfaces (APIs).

20. The method of claim 18, wherein the Radio parameter prediction model
(i) imports 3D terrain map;
(ii) segments the 3D terrain map to determine a segment that comprises at least one area with a similar RF environment;
(iii) statistically samples the segment;
(iv) runs preliminary predicted Radio parameters on a sampled segment, wherein the preliminary predicted Radio parameter is selected based on a best-suited Radio parameter prediction model corresponding to the segment;
(v) gathers field measurement data for the segment;
(vi) tunes the Radio parameter prediction Model with the at least one Radio parameter to obtain an upgraded Radio parameter prediction model based on the segment; and
(vii) uses the upgraded Radio parameter prediction model to perform the Radio parameter prediction on the segments that comprise similar morphology.

21. The method of claim 20, wherein the Radio parameter prediction model stores layers of data that are over-laid over 3D terrain data for a given location in the radio mapping database, wherein the layers of data comprise a first layer, a second layer, a third layer, and a fourth layer, wherein the first layer represents the 3D terrain data, the second layer represents a first level of the at least one Radio parameter prediction, the third layer represents a measurement of sample points and the fourth layer represents the predicted Radio parameters based on the upgraded Radio parameter prediction model.

22. A method of predicting at least one dynamically changed parameter using a radio mapping architecture, the method comprising:

capturing, using at least one of a User Equipment (UE) or a spectrum monitoring unit, at least one Radio parameter;

continuously monitoring, using the spectrum monitoring unit, the at least one Radio parameter and storing the at least one Radio parameter in a radio mapping database;

extracting, using the spectrum monitoring unit, the at least one Radio parameter that corresponds to at least one base station and the User Equipment (UE) to populate an input schema for the radio mapping database and periodically updating extracted parameters in the radio mapping database;

training, using a Machine learning module associated with a server, a Machine Learning model based on the at least one Radio parameter stored in the radio mapping database;

predicting the at least one dynamically changed parameter from the input schema that is stored in the radio mapping database to derive an output schema based on the Machine Learning model;

updating the at least one dynamically changed parameter that is predicted by the Machine Learning model in the radio mapping database;

dynamically refining the Machine Learning Model based on the at least one Radio parameter or the extracted parameters;

generating triggers to the spectrum monitoring unit and the UE to update the at least one Radio parameter stored in the radio mapping database; and designing using the Machine Learning module a group of signal waveforms to provide optimum performance to the UE at a location based on the dynamically predicted Radio parameters and the at least one Radio parameter corresponds to the location of the UE stored at the radio mapping database.

* * * * *